United States Patent [19]
Knapp

[11] Patent Number: 5,779,380
[45] Date of Patent: Jul. 14, 1998

[54] STRIP FOR JOINING COMPONENTS

[75] Inventor: Friedrich Knapp, Amstetten, Austria

[73] Assignee: Friedrich Knapp Gesellschaft M.B.H., Amstetten, Australia

[21] Appl. No.: 750,667

[22] PCT Filed: Jun. 9, 1995

[86] PCT No.: PCT/AT95/00115

§ 371 Date: Dec. 17, 1996

§ 102(e) Date: Dec. 17, 1996

[87] PCT Pub. No.: WO95/35050

PCT Pub. Date: Dec. 28, 1995

[30] Foreign Application Priority Data

Jun. 17, 1994 [DE] Germany ............... 44 21 398.0

[51] Int. Cl.[6] .................................................. B25G 3/00
[52] U.S. Cl. ................... 403/331; 403/340; 403/329; 403/405.1; 403/409.1
[58] Field of Search .................................. 403/331, 339, 403/340, 326, 327, 328, 329, 315, 316, 319, 405.1, 409.1

[56] References Cited

U.S. PATENT DOCUMENTS

| 924,912 | 6/1909 | Maydl | 403/407.1 |
|---|---|---|---|
| 1,533,724 | 4/1925 | Clarke-James | 403/407.1 |
| 1,719,072 | 7/1929 | Myers | 403/326 |
| 2,200,158 | 5/1940 | Clarke | 403/407.1 X |
| 2,703,912 | 3/1955 | Tinnermann et al. | |
| 2,994,888 | 8/1961 | Minuti | 403/407.1 X |
| 3,596,942 | 8/1971 | Zoebelein | 403/407.1 |
| 4,470,716 | 9/1984 | Welch | 403/407.1 X |
| 4,473,316 | 9/1984 | Welch | 403/407.1 X |
| 4,865,503 | 9/1989 | Kaimo | 403/326 X |
| 4,898,326 | 2/1990 | Edwards et al. | 403/329 X |

FOREIGN PATENT DOCUMENTS

| 40589/72 | 10/1973 | Austria. | |
|---|---|---|---|
| 2346590 | 10/1977 | France. | |
| 1779745 | 9/1971 | Germany. | |
| 8903252.7 | 11/1989 | Germany. | |
| 445121 | 6/1948 | Italy | 403/407.1 |
| 759545 | 10/1956 | United Kingdom. | |

*Primary Examiner*—Daniel P. Stodola
*Assistant Examiner*—Bruce A. Lev
*Attorney, Agent, or Firm*—Spencer & Frank

[57] ABSTRACT

A connection for connecting structural elements (6, 7) in a butt joint, comprised of rigid connecting elements (B1) having a substantially rectangular cross-section of a predetermined thickness (d), wherein a first connection half formed of the connecting elements (B1) is fastened to the surface of a first structural element (6) to be connected, and a second connection half formed of the connecting elements (B1) is fastened to the surface, or preferably in a recess, of a second structural element (7) to be connected. The connecting elements (B1) each have an offset connecting tab (1) with an offset (V) corresponding to the thickness (d) of a connecting element (B1) ensuring that the connecting tabs (1) engage one below the other without clearance and under positive locking.

15 Claims, 8 Drawing Sheets

STRIP FOR JOINING COMPONENTS

BACKGROUND OF THE INVENTION

The invention in general relates to a connecting means for releasably connecting structural elements, in particular to a connecting means for a butt joint.

A connecting means for such a purpose is, e.g., known from DE 1 779 745 B. With this arrangement, a recess is provided in one of the structural elements to be connected, in which an offset resilient strip is fastened. The offset end section of the resilient strip has a longitudinal slot for receiving a retention screw provided on the counterpiece to be connected. However, such an arrangement is suited for low loads only and provides only little security against torsion.

From FR 23 46 590 A, a connecting device is known which consists of two positively interengaging connecting elements, one of which being provided with a hook and the other one being provided with a hook opening. Although this connecting device seems suitable to accommodate high forces, too, it does, still, have substantial drawbacks. Apart from the fact that the production costs of this connecting device are very high on account of its complicated shape, the connecting elements, as a consequence of their special shape, can be interconnected in a single way only.

Finally, from DE 89 03 252 U a connecting device for shelves is known where only hooking-in of beams in apertures of standards by aid of hook-shaped suspension parts is provided for. Also this connecting device is not multi-valently adaptable to given conditions of space.

SUMMARY OF THE INVENTION

Thus, it is an object of the invention to provide a connecting means for connecting structural elements, whose individual components (elements) have a very simple shape so that they can be produced at low cost. Furthermore, the individual elements shall be capable of being combined such that at the site of connection, a connecting means of proper size and of a high connection stability can be provided in accordance with the given conditions of space.

Accordingly, the invention provides for a connecting means for connecting structural elements and comprising at least two rod or plate-shaped, substantially rigid connecting elements each to be connected as one half of the connection means with one of the structural elements, and having a substantially rectangular cross-section and a uniform material thickness, a first end of one of the connecting elements being designed as an offset connecting tab which is offset in parallel by the material thickness relative to the remaining part of the connecting element which serves as a fastening base.

Accordingly, the invention provides for a connecting means the construction of which is very simple in an advantageous manner and which may comprise uniformly designed, substantially rigid connecting elements, with which one respective half of a connecting means can be built up, depending on the requirements with regard to retention force and the spacial installation conditions. It is, thus, substantial that by using uniform connecting elements or connecting elements of the same type, whose construction is very simple, connecting means of various embodiments can be provided, a low-cost produceability and storability being ensured.

For making a connection by aid of the connecting means according to the invention, it may, e.g., be proceeded such that one side or face of the first structural element to be connected is provided with a recess of a depth corresponding to the height of a connecting element. A first connecting element is fastened to the bottom of this recess with its fastening base such that its offset connecting tab is spaced from the bottom of the recess and ends flush with the surface of the structural element. To the surface of a second structural element a second such connecting element is fastened. With the structural parts assembled, the offset connecting tabs of the first and second connecting elements engage one underneath the other and provide for a positive connection.

It is, however, also possible to provide the connection simply by fastening the connecting elements to the surfaces of the structural elements to be connected.

According to a preferred embodiment of the connecting means according to the invention the connecting tab is provided with at least one insertion slot which is open towards the tab end to accommodate the shaft of a retention screw, and the second end of the fastening base located opposite the connecting tab has a bore aligned with each insertion slot and corresponding to the slot width, for the shaft of a further retention screw. With this embodiment, thus an additional retention element is used which has the form of a screw and is tightly connected to the respective structural element at the end of the fastening base of the connecting element, i.e. opposite the offset connecting tabs. The offset connecting tabs have an insertion slot so as to accommodate the respective retention screw in the connected state, wherein the connecting tabs engage under the head of the retention screw. On account of these additional retention elements, the connection has a particularly high loading capacity.

The loading capacity may also be increased in that the second end of the fastening base is bent in the shape of a U in the direction to the connecting tab, the channel formed between the fastening base and a leg having a clear width corresponding to the material thickness. In this embodiment, the connecting tabs each engage in the respective other U-shaped end sections and are held there by positive locking. In addition, it is suitable if the leg has a bore in alignment with a bore of the fastening base so as to accommodate a retention screw.

It is also advantageous if the offset connecting tabs have a chamfer for improving their joinability. Similarly, it has proved to be advantageous if the insertion slots of the connecting elements are outwardly widened in wedge-shape to improve their joinability.

A particularly simple connection can be made if the connecting tabs of two oppositely arranged connection elements engage one behind the other one in the assembled state of the connecting elements. An increased stability is obtained if the connecting tab of one connecting element is received in the channel of the oppositely arranged connection element in the connected state of the connecting elements. To increase the strength of the connection, the connecting tabs may engage one behind the other in the connected state of the connecting elements, in alternating fashion, and may surround the insertion slots of the shafts of the retention screws. On the other hand, it is advantageous if in the connected state of the connecting elements, the connecting tab of the one connecting element is received in the channel of the oppositely arranged connecting element and the insertion slot surrounds the shaft of the retention screw.

For a high loading capacity, also an embodiment of the connecting means has proved advantageous which is characterised in that a first connecting means half is comprised of two connecting elements arranged at a pre-determined distance in parallel to each other, which are interconnected at the non-offset end sections by means of a transverse web, the end sections of the transverse web being fastened to these end sections of the connecting elements, and the transverse web having a retention screw at its center, and in that a second connecting means half is comprised of a connecting element having a width corresponding to the pre-determined distance, wherein a transverse web is fastened to the non-offset end section, which transverse web has a retention screw at each of its two end sections.

To increase the strength of connection, the connecting elements may also be arranged in cascade form according to the connection area available.

It is a further advantage if a spring element is arranged between the two connecting elements to be connected, e.g. a leaf spring, which is fastened to one of the connecting elements and creates a pre-stress preventing the connecting elements from sliding out easily of their connected position.

Finally, it is also suitable if the connecting elements and optionally the further retention elements consist of a material of higher strength, preferably of metal.

It is a main point of view of the invention that the interengaged connecting elements are substantially rigid, i.e. not resilient, and that the offset connecting tabs of the connecting elements substantially engage without clearance and under positive locking. The individual connecting elements have a very simple geometric and substantially uniform configuration, so that a low-cost mass production is possible. Furthermore, this simple geometric shape enables an automated production of the connecting means. The connecting elements may be stored easily and fastened automatically to the structural elements to be connected by means of mounting devices.

Further characteristics of the invention will appear from the following description and the drawings, in which advantageous exemplary embodiments are schematically illustrated.

DESCRIPTION OF THE PREFERRED EMBODIMENTS

Figure 1A:
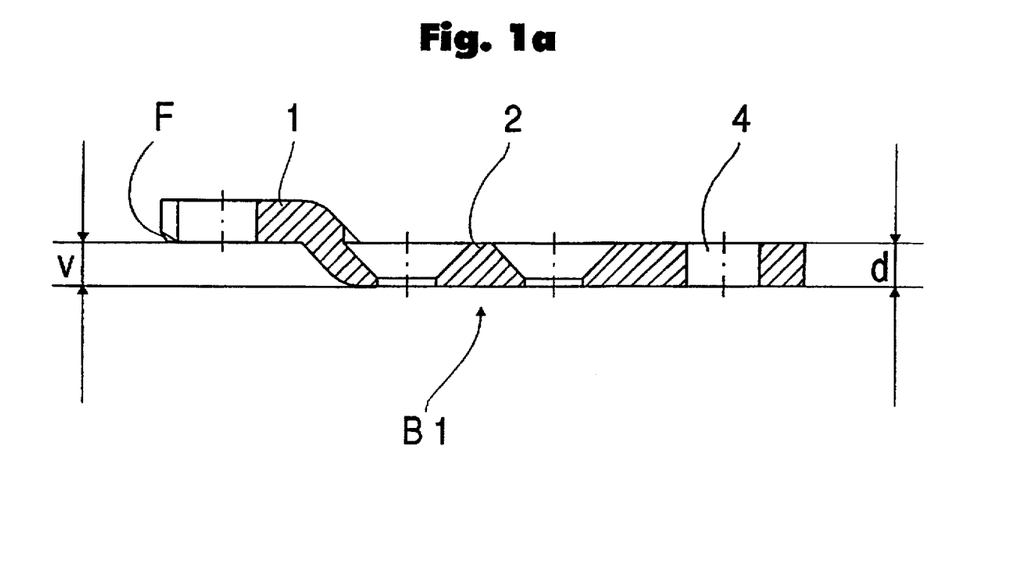
FIGS. 1a and 1b show an offset connecting element in longitudinal section and in a top view.
Figure 1B:
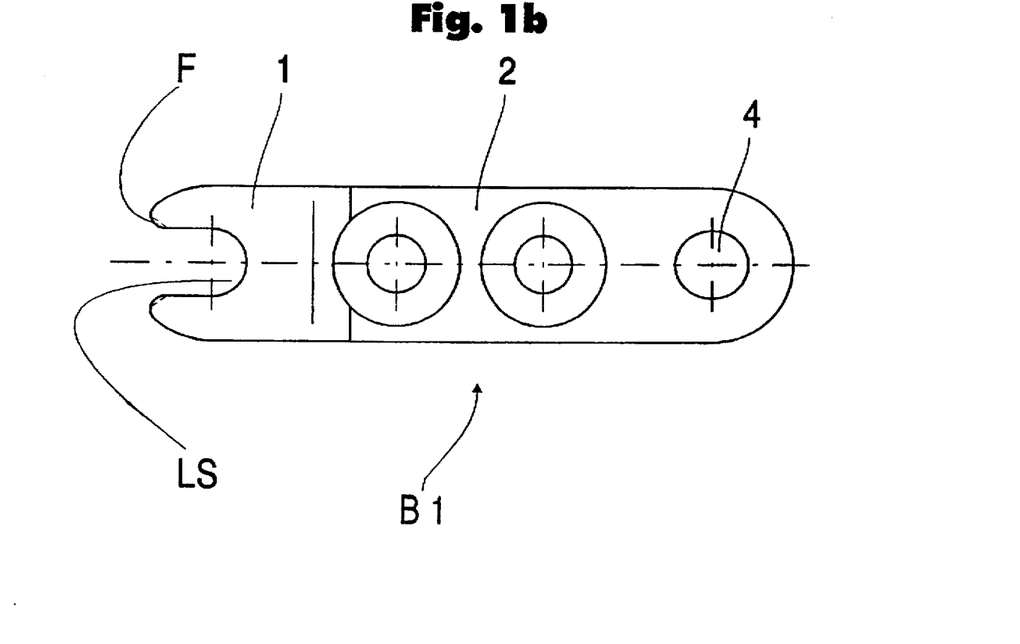

In its simplest embodiment according to FIGS. 7a to 7d, the connecting means for connecting two structural elements in a butt joint consists basically of at least two equal connecting elements B1 according to FIGS. 1a and 1b. The respective connecting element B1 itself is a piece of flat strip material having rectangular cross-section and a thickness d (FIG. 1a). One end is offset in parallel to the remaining portion. This offset forms a connecting tab 1. The connecting tab 1 is offset relative to the remaining portion by an amount V which equals the material thickness d. The remaining portion is designated as fastening base 2 which, in this exemplary embodiment illustrated, comprises two fastening holes for countersunk screws 3. The connecting tab 1 has an insertion slot LS in alignment with and symmetrical to the longitudinal axis of symmetry of the connecting element B1, which insertion slot LS is flared in funnel-shape. Furthermore, a wedge-shaped chamfer F is provided at the lower side of the connecting tab 1. At the end of the fastening base 2, a bore 4 is provided in alignment with the insertion slot LS. The insertion slot LS and the bore 4 will be explained in more detail with a view to their function.

Figure 7A:
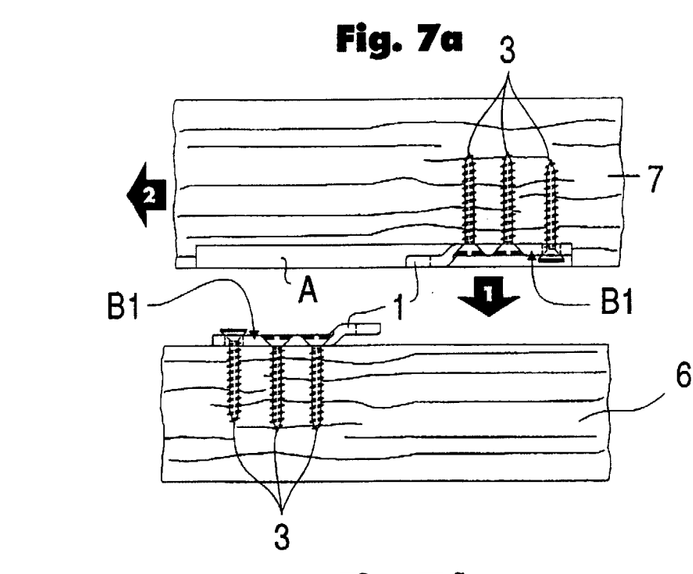
FIGS. 7a to 7d show the connecting means according to FIGS. 1a and 1b in its simplest form of connection, FIGS. 7a and 7c illustrating for the sake of clarity the state before connecting the structural elements, and FIGS. 7b and 7d illustrating the state after the connection has been made— each in side view and in top view, respectively.
Figure 7B:
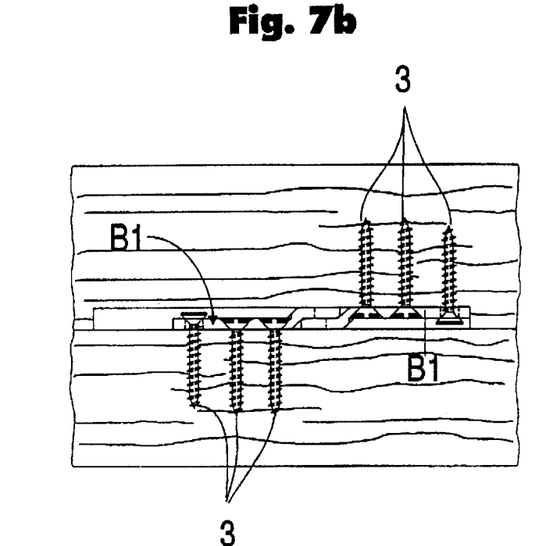
Figure 7C:
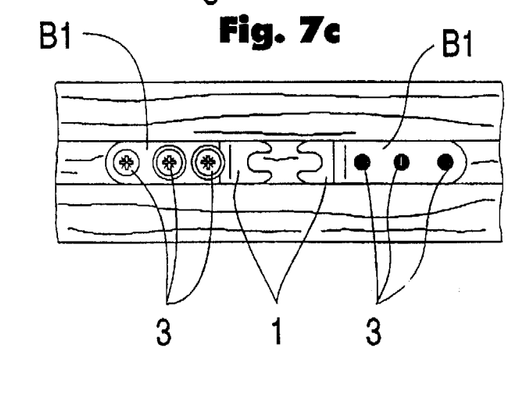
Figure 7D:
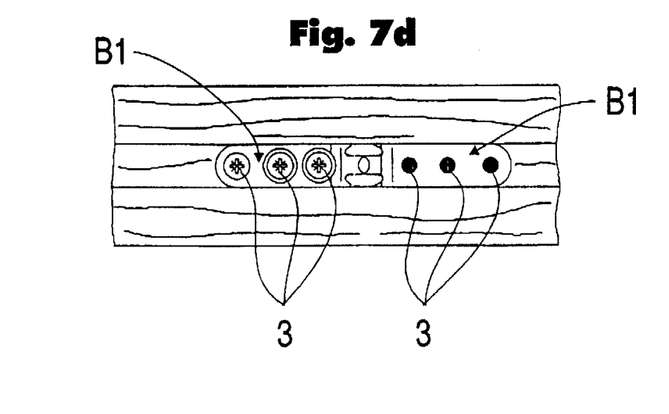
Figure 8A:
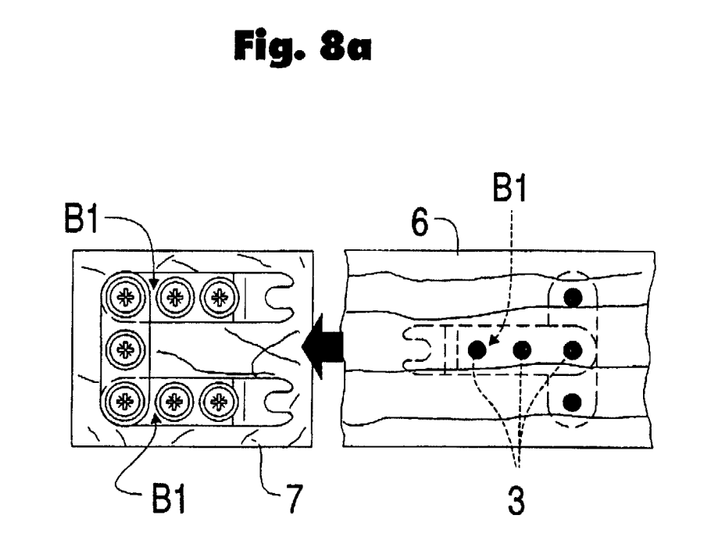
FIGS. 8a to 8d show a connection means according to FIGS. 3a to 3d in respective illustrations, wherein none of the structural elements to be connected comprises a recess, FIGS. 8a and 8b illustrating for the sake of clarity the state before connecting the structural elements, and FIGS. 8c and 8d illustrating the state after the connection has been made.
Figure 8B:
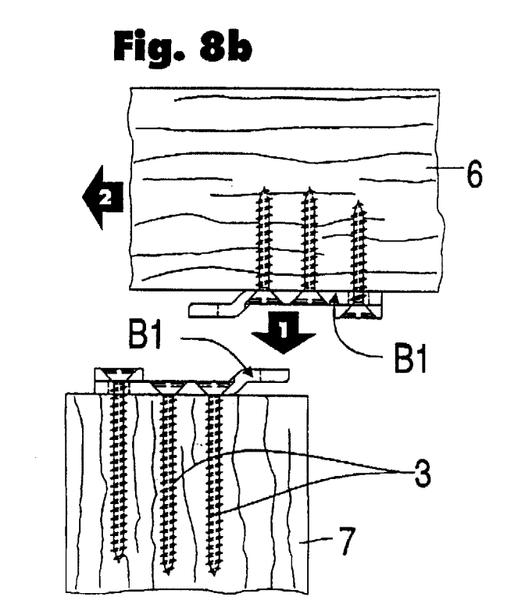
Figure 8C:
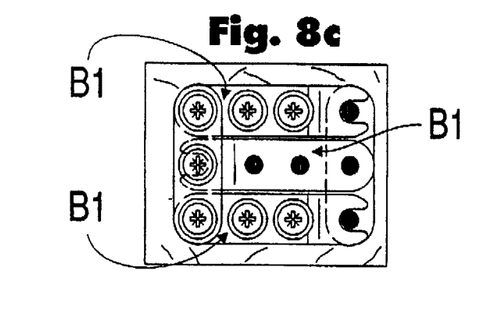
Figure 8D:
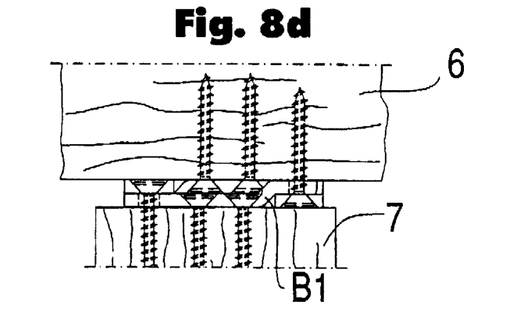

To produce the connection of the structural elements according to FIGS. 7a to 7d, a first connecting element B1 is tightly screwed to the surface of a first structural element 6 such that its connecting tab 1 is spaced by a distance from the surface of the structural element. This distance corresponds to the thickness d of the connecting element B1. The second connecting element B1 is fastened to the base of a recess A of the second structural element 7 to be connected, analogous to the first connection element B1. In this embodiment, the depth of the recess A corresponds to twice the thickness d of a connecting element B1. To connect the two structural elements 6, 7, they are assembled such that the connecting tabs 1 engage one under the other, as is particularly apparent from FIG. 7b. The chamfers F cause a safe sliding of the connecting tabs 1 underneath one another. It goes without saying that the length of the recess A must be dimensioned such that it corresponds at least to the length of two connecting elements B1. FIG. 7b also shows clearly that the two superimposed connecting tabs 1 fill the recess A, so that a positive connection is formed and the structural elements abut each other without any gaps.

If the connection is to have a particularly high retention capacity, an embodiment according to FIGS. 2a to 2d is preferred. In this embodiment, an additional retention element is used, which preferably is designed as a screw 8 having a head 9. The shaft of this screw 8 extends through the bore 4 at the end of the connecting element B1, wherein, according to FIG. 2b, the lower edge of the screw head 9 has a distance to the surface of the connecting element B1 which corresponds to the thickness d of the connecting element B1.

Figure 2A:
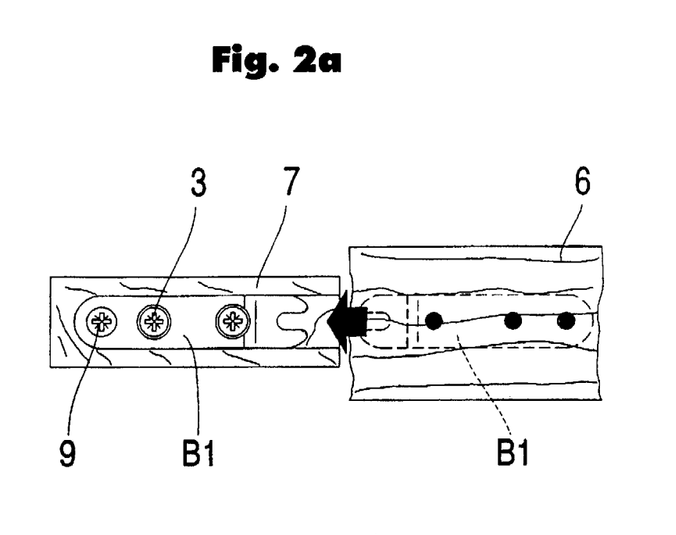
FIGS. 2a to 2d schematically illustrate how two structural elements are connected by aid of respective connecting elements according to FIG. 1, these illustrations being a top view (FIG. 2a) and a side view (FIG. 2b), in the connected state in a top view, FIG. 2c) and in side view (FIG. 2d).
Figures 2B, 2C:
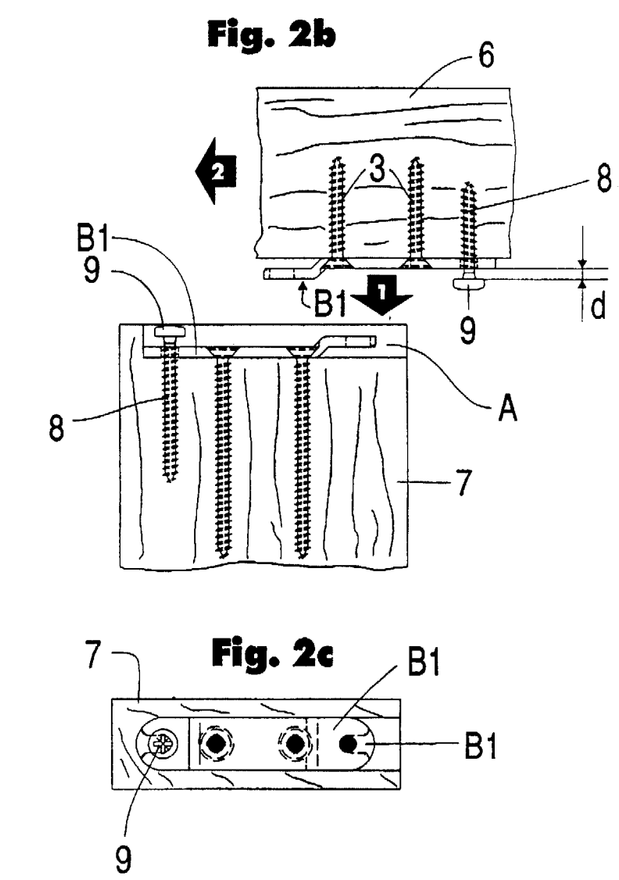
Figure 2D:
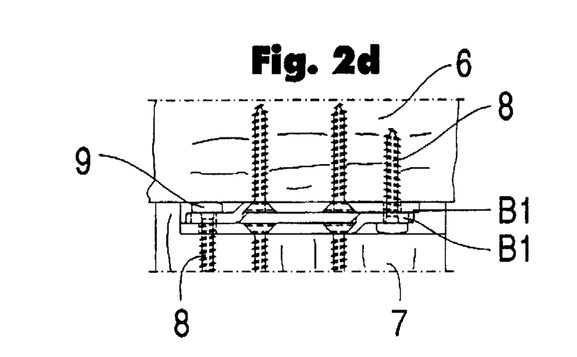

The structural elements 6, 7 are superimposed according to FIGS. 2a and 2b, in the direction of the arrows, and mutually shifted until the connecting tabs 1 mutually engage below the screw heads 9 by their insertion slots LS. The funnel-shaped flarings of the insertion slots LS facilitate gripping of the shafts of the screws 8. With this embodiment of the connection, the depth of the recess A equals three times the thickness d of a connecting element B1.

Figure 3A:
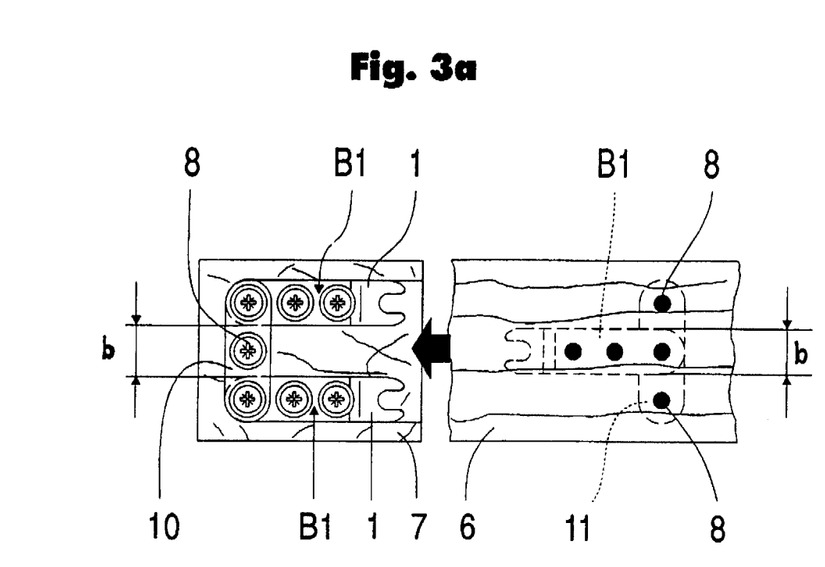
FIGS. 3a to 3d show a further embodiment of a connecting means comprising several connecting elements as well as the functional cooperation during assembly, these illustrations being top views (FIGS. 3a, 3c) and side views (FIGS. 3b, 3d).
Figure 3B:
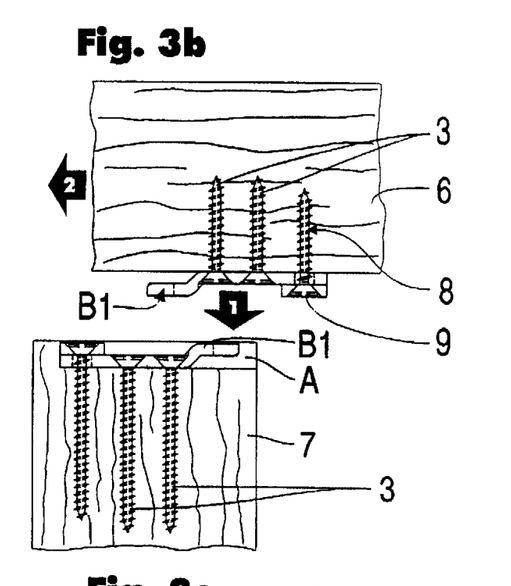
Figure 3C:
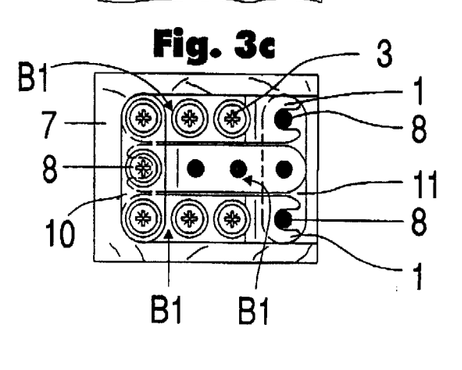
Figure 3D:
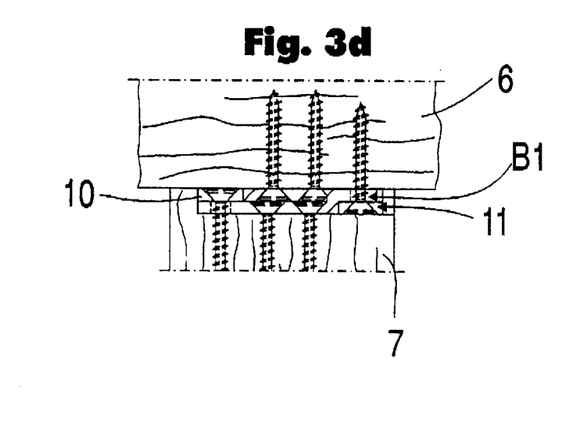

In FIGS. 3a to 3d, a connecting means is shown which has several connecting elements B1 in combination. Thus, according to FIG. 3a, the structural element 7 to be connected and having the recess A is provided with two connecting elements B1 which have been screwed to the bottom of the recess A parallel to each other at a pre-determined distance. This distance corresponds to the width b of a connecting element B1 which has been screwed onto the other structural element 6 to be connected. Across the two connecting elements B1 arranged in parallel, a transverse web 10 has been screwed, which has been provided with a retention screw 8 at its center to increase its retention force. The other structural element 6 carries one connecting element B1 only, and a transverse web 11 arranged at a right angle thereto, which transverse web 11 is fastened at its center by a fastening screw and has a retention screw 8 at each of its ends. In this case of application, the retention screws 8 are countersunk head screws. In FIGS. 3c and 3d, this connecting means is shown in its assembled state, wherein the connecting tab 1 of the connecting element B1 of the structural element 6 engages below the retention screw 8 of the transverse web 10 of the structural element 7, and the connecting tabs 1 of the connecting elements B1 of the structural element 7 engage below the two retention screws 8 on the transverse web 11 of the structural element 6.

It ought to be emphasized that the arrangement of the connecting elements B1 can be combined at will in cascades and that their number can be increased at will so that the conditions of space and area provided for the connection can be used to an optimum.

Figure 4A:
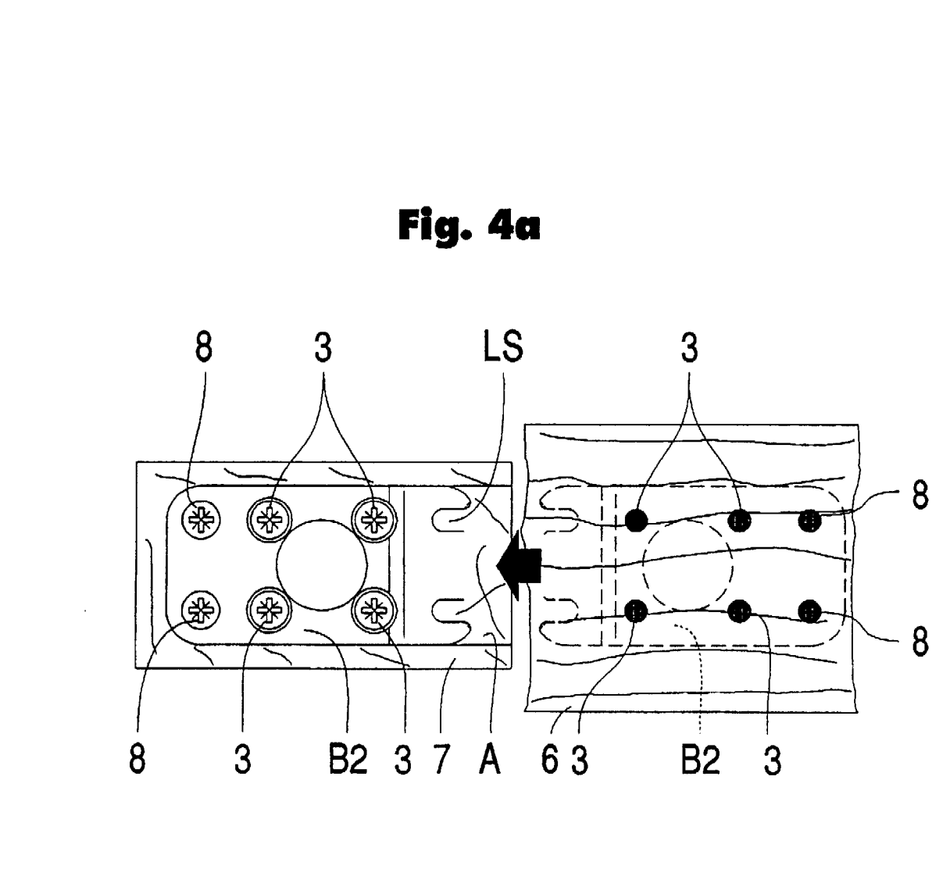
FIGS. 4a and 4b show a further embodiment of two structural elements to be connected, each including a connecting element and having two longitudinal slots, before and after the connection has been made.
Figure 4B:
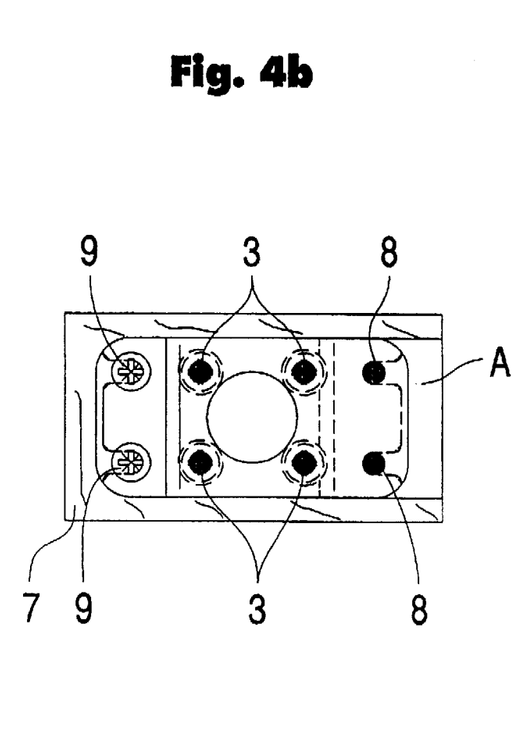

FIGS. 4a and 4b show a connecting means comprising two plate-shaped connecting elements B2, each having two insertion slots LS, two retention screws 8 and four fastening screws 3. By using plate-shaped elements having several insertion slots, a smaller number of individual elements is required so that less production time is required when producing a connecting means.

Figures 5A, 5B, 5C, 5D:
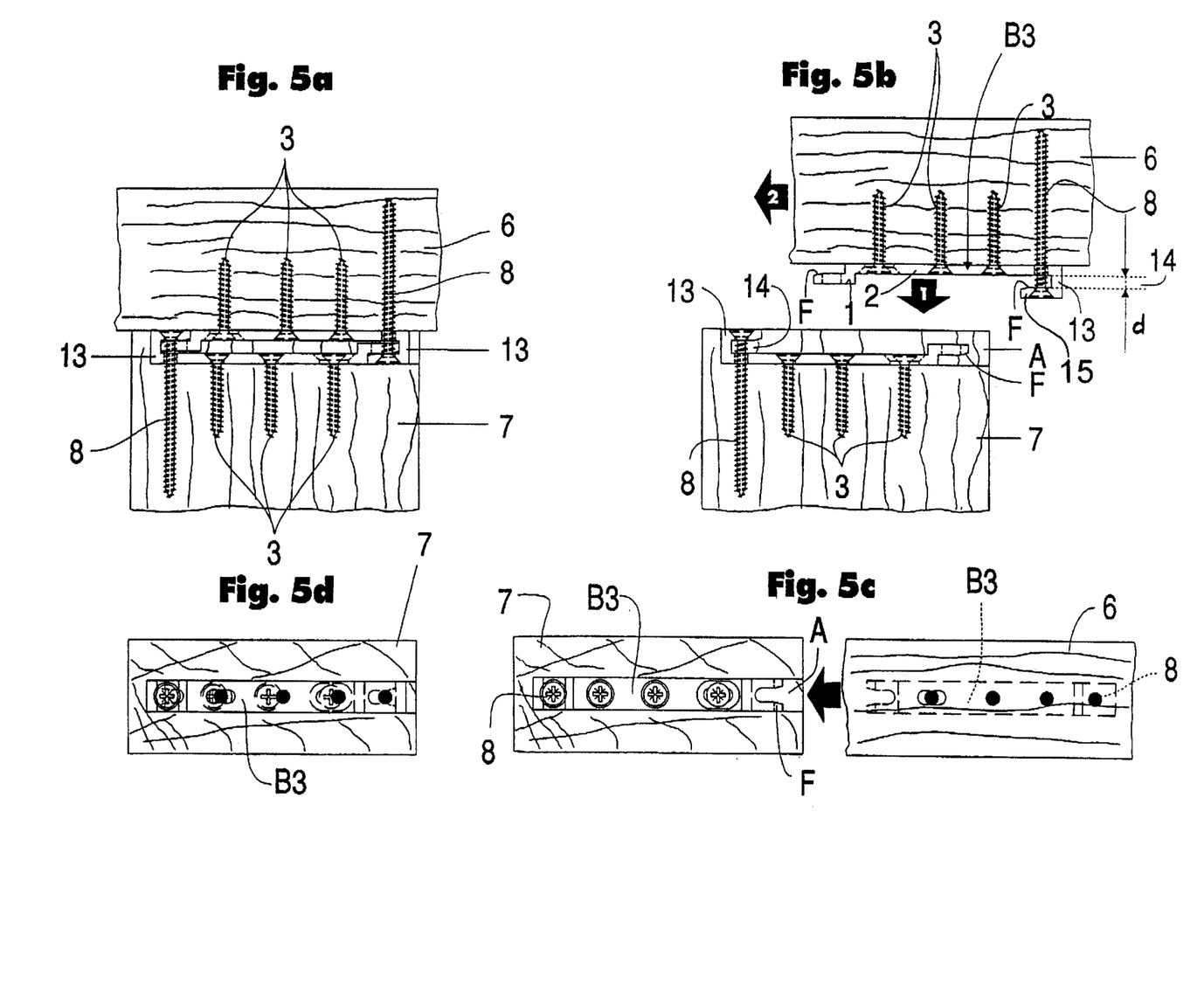
FIGS. 5a to 5d shows a further embodiment of two structural elements each having a web-shaped connecting element angled off in U-shape at one end section, with FIGS. 5b and 5c showing the unconnected state in side view and in top view, respectively, and FIGS. 5a and 5d showing the connected state thereof.

FIGS. 5a and 5d show a connecting means having two connecting elements B3 which correspond to the connecting elements B1 in terms of the base 2 and the offset connecting tab 1, which, however, have a U-shaped bend 13 at their end section arranged opposite the connecting tab 1, the clear width (channel) 14 between the leg 15 and the fastening base 2 corresponding to the thickness d of a connecting element. The U-shaped bend 13 additionally increases the stability of the connection in that the two connecting elements B3 mutually engage under each other at both of their ends. There, the leg 15 takes on the function of the screw head 9 of the connecting elements B1 and B2.

Figure 6A:
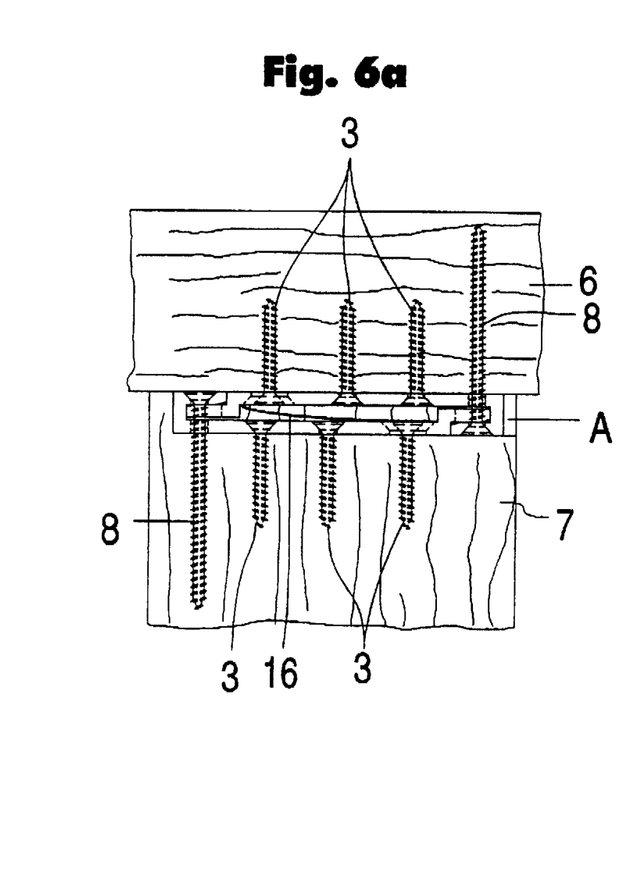
FIGS. 6a and 6b show the subject matter of FIGS. 5a to 5d in a further embodiment comprising a leaf spring.
Figure 6B:
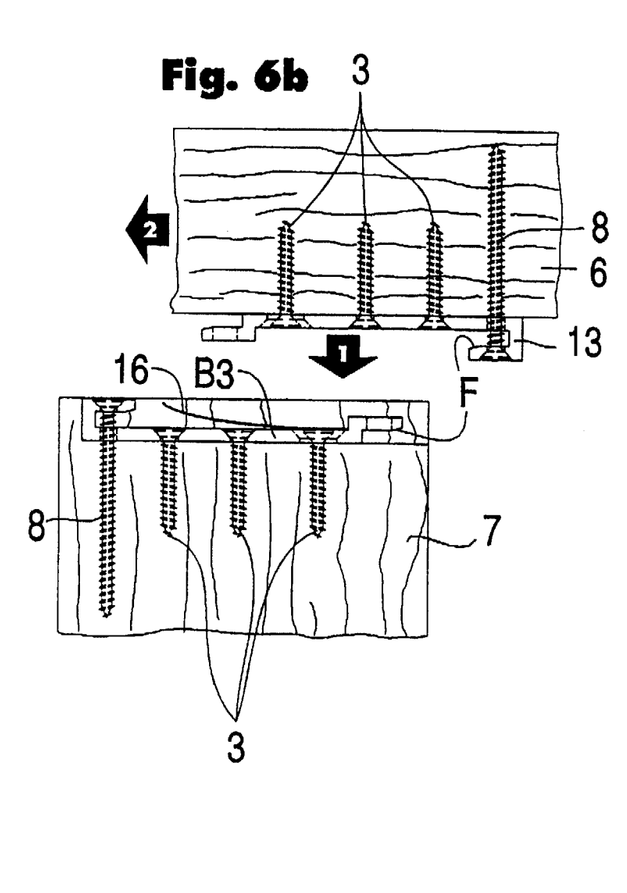

FIGS. 6a and 6b show a connecting means comprising two connecting elements B3 according to FIGS. 5a to 5d. In addition, a spring element 16 is arranged between the connecting elements B3 to be connected, the spring element being fastened to one connecting element B3. Preferably, the spring element 16 is a leaf spring. By this leaf spring, an additional pre-stress is created which prevents the connecting elements B3 from slipping out of their connected positions.

FIGS. 8a to 8d illustrate a further embodiment, wherein the connecting means is not fastened in a recess. There are cases of application, in which the provision of a recess is not suitable. In such cases, the connecting means may also be fastened to each of the external surfaces of the structural elements to be connected, as is particularly illustrated in FIGS. 8b and 8d.

The foregoing description of embodiments merely serves to explain a few exemplary embodiments of the subject matter of the invention. Clearly, numerous and different other arrangements may be carried out by the skilled artisan when having knowledge of the above teachings, yet these are to be considered to be within the scope of the invention.

I claim:

1. A connecting device for connecting structural elements to one another, comprising first and second, generally flat, substantially rigid connecting elements, each to be connected, as a separate one half of the connecting device, with a first and a second structural element; each connecting element having a substantially rectangular cross section and a uniform material thickness; at least said first connecting element including
   (a) a fastening base having first and second opposite ends;
   (b) a connecting tab extending from said first end away from and parallel to said fastening base; said connecting tab being offset from said fastening base by a distance equal to said material thickness; said connecting tab having a free tab end and an insertion slot open towards said free tab end to accommodate a shaft of a retention screw; and
   (c) a bore hole provided in said fastening base in a region of said second end thereof to provide for a passage for a further retention screw.

2. The connecting device as defined in claim 1, wherein said bore hole is located at said second end of said fastening base.

3. The connecting device as defined in claim 2, wherein said bore hole is aligned with said insertion slot and further wherein said bore hole and said insertion slot have identical widths.

4. The connecting device as defined in claim 1, wherein said second end is formed as a U-shaped terminus of said connecting device; said terminus having a bend extending from said fastening base and continuing in a leg; said leg extending towards said insertion slot and defining a channel with said fastening base; said leg having a surface facing a surface of said fastening base; a clearance between said surfaces defining a clear width of said channel; said clear width having a dimension corresponding to said material thickness.

5. The connecting device as defined in claim 4, further comprising a bore hole provided in said leg; said bore hole in said leg being aligned with said bore hole in said fastening base.

6. The connecting device as defined in claim 1, wherein said connecting tab has a chamfer for improving joinability.

7. The connecting device as defined in claim 1, wherein said insertion slot is flaring outwardly to improve joinability.

8. The connecting device as defined in claim 1, further comprising a spring element fastened to one of said first and second connecting elements and being situated therebetween in the connected state of the connecting device for generating a pre-stressing force to prevent said first and second connecting elements from readily slipping out of a connected position thereof.

9. The connecting device as defined in claim 8, wherein said spring element is a leaf spring.

10. A connecting device for connecting structural elements to one another, comprising first and second, generally flat, substantially rigid connecting elements, each to be connected, as one half of the connecting device, with a first and a second structural element; each connecting element having a substantially rectangular cross section and a uniform material thickness; each connecting element including (a) a fastening base having first and second opposite ends;

(b) a connecting tab extending from said first end away from and parallel to said fastening base; said connecting tab being offset from said fastening base by a distance equal to said material thickness; said connecting tab having a free tab end and an insertion slot open towards said free tab end to accommodate a shaft of a retention screw, whereby in a connected state of the connecting device the connecting tab of the first connecting element and the connecting tab of the second connecting element is adapted to assume an overlapping relationship such that the connecting tab of the first connecting element is substantially coplanar with the fastening base of the second connecting element and the connecting tab of the second connecting element is substantially coplanar with the fastening base of the first connecting element; and (c) a bore hole provided in said fastening base to provide for a passage for a further retention screw.

11. The connecting device as defined in claim 10, wherein said second end is formed as a U-shaped terminus of said connecting device; said terminus having a bend extending from said fastening base and continuing in a leg; said leg extending towards said insertion slot and defining a channel with said fastening base; said leg having a surface facing a surface of said fastening base; a clearance between said surfaces defining a clear width of said channel; said clear width having a dimension corresponding to said material thickness, whereby in a connected state of said connecting device said channel of said first connecting element accommodates said connecting tab of said second connecting element.

12. The connecting device as defined in claim 10, wherein in a connected state of said connecting device said insertion slot of the tab of the first connecting element is in alignment with said insertion slot of the tab of the second connecting element when said tabs are in an overlapping relationship.

13. A connecting device for connecting structural elements to one another, comprising first and second, generally flat, substantially rigid connecting elements, each to be connected, as one half of the connecting device, with a first and a second structural element; each connecting element having a substantially rectangular cross section and a uniform material thickness;

said first connecting element including (a) first and second connecting members extending parallel to and spaced from one another at a predetermined distance; said first and second connecting members each including (1) a fastening base having first and second opposite ends;

(2) a connecting tab extending from said first end away from and parallel to said fastening base; said connecting tab being offset from said fastening base by a distance equal to said material thickness; said connecting tab having a free tab end and an insertion slot open towards said free tab end to accommodate a shaft of a first retention screw for the first connecting member and a second retention screw for the second connecting member;

(3) a bore hole provided in said fastening base to provide for a passage for a third retention screw; and (b) a transverse web coupling said first and second connecting members to one another at respective said second ends thereof; said transverse web having a bore hole between said second ends of said first and second connecting members to provide for a passage for a fourth retention screw;

said second connecting element including (a) a single connecting member having a width permitting said single connecting member to be accommodated between said first and second connecting members of said first connecting element; said single connecting member including (1) a fastening base having first and second opposite ends;

(2) a connecting tab extending from said first end away from and parallel to said fastening base; said connecting tab being offset from said fastening base by a distance equal to said material thickness; said connecting tab having a free tab end and an insertion slot open towards said free tab end to accommodate a shaft of a first retention screw; and (3) a bore hole provided in said fastening base to provide for a passage for a fifth retention screw; and (b) a transverse web attached to said second end of said of said fastening base and extending transversely thereto; said transverse web having bore holes on either side of said second end of said fastening base to provide for a passage for the first and second retention screws.

14. A structural assembly comprising (a) a first structural element having a surface;

(b) a second structural element having a surface and a recess provided therein; said recess having a depth;

(c) a connecting device connecting said first and second structural elements to one another; said connecting device comprising first and second, generally flat, substantially rigid connecting elements each having a substantially rectangular cross section and a uniform material thickness; said first and second connecting elements each including (1) a fastening base having first and second opposite ends; the fastening base of said first connecting element being positioned on said surface of said first structural element and the fastening base of said second connecting element being positioned in said recess of said second structural element;

(2) a connecting tab extending from said first end away from and parallel to said fastening base; said connecting tab being offset from said fastening base by a distance equal to said material thickness; said connecting tab having a free tab end; and an insertion slot open towards said free tab end;

(3) a bore hole provided in said fastening base;

(d) a first retention screw passing through said bore hole of said fastening base of said first connecting element for securing said first connecting element to said surface of said first structural element; and (e) a second retention screw passing through said bore hole of said fastening base of said second connecting element for securing said second connecting element to said base of said recess of said second structural element; said depth of said recess being dimensioned such that said connecting tabs of said first and second connecting elements engage one another under pre-stress and form a positive connection substantially without clearance.

15. The structural assembly as defined in claim 14, wherein said insertion slots of the connecting tabs of said first and second connecting elements are in alignment with one another; and further comprising a third retention screw passing through said insertion slots and threadedly engaging one of said first and second structural elements.

* * * * *